Figure 9:
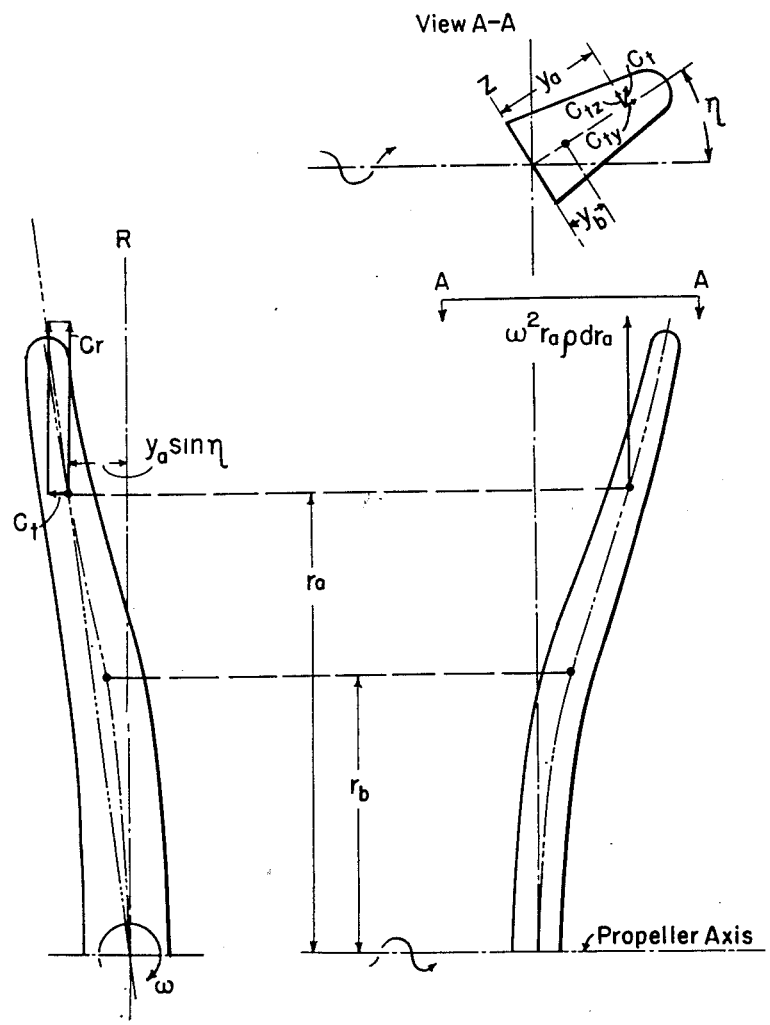

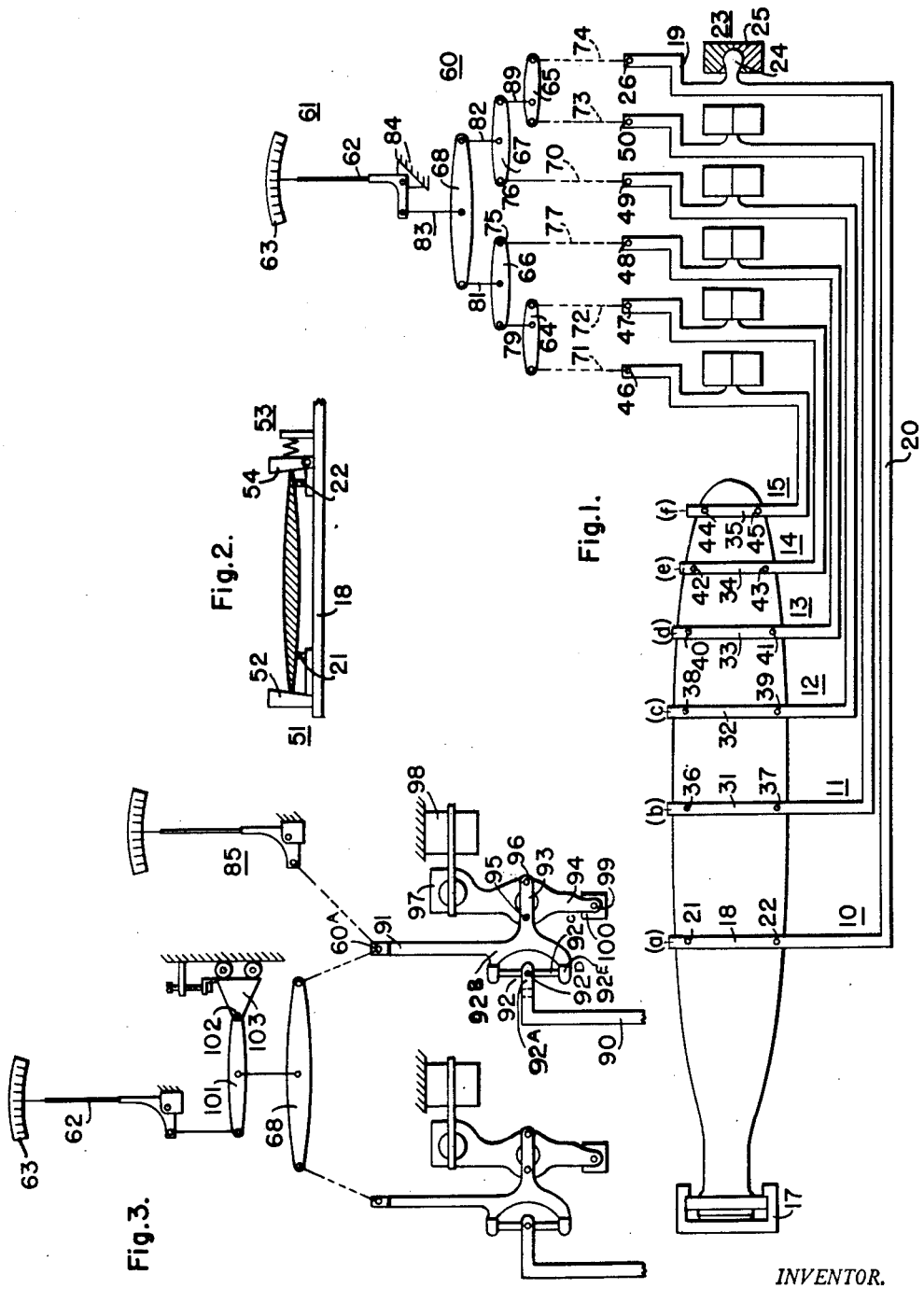

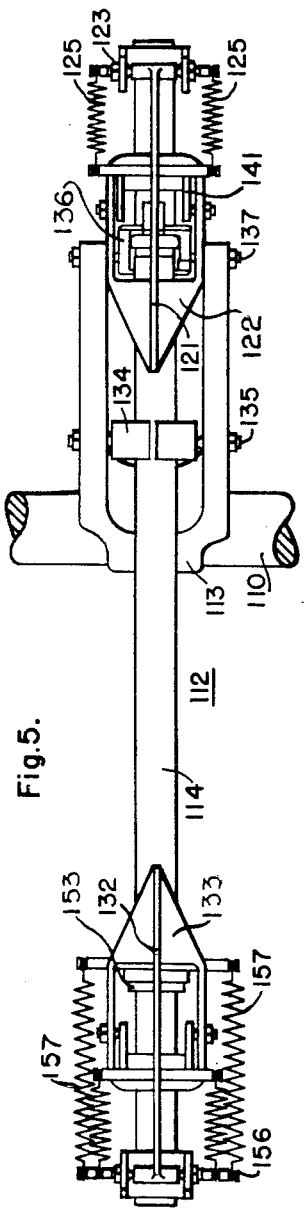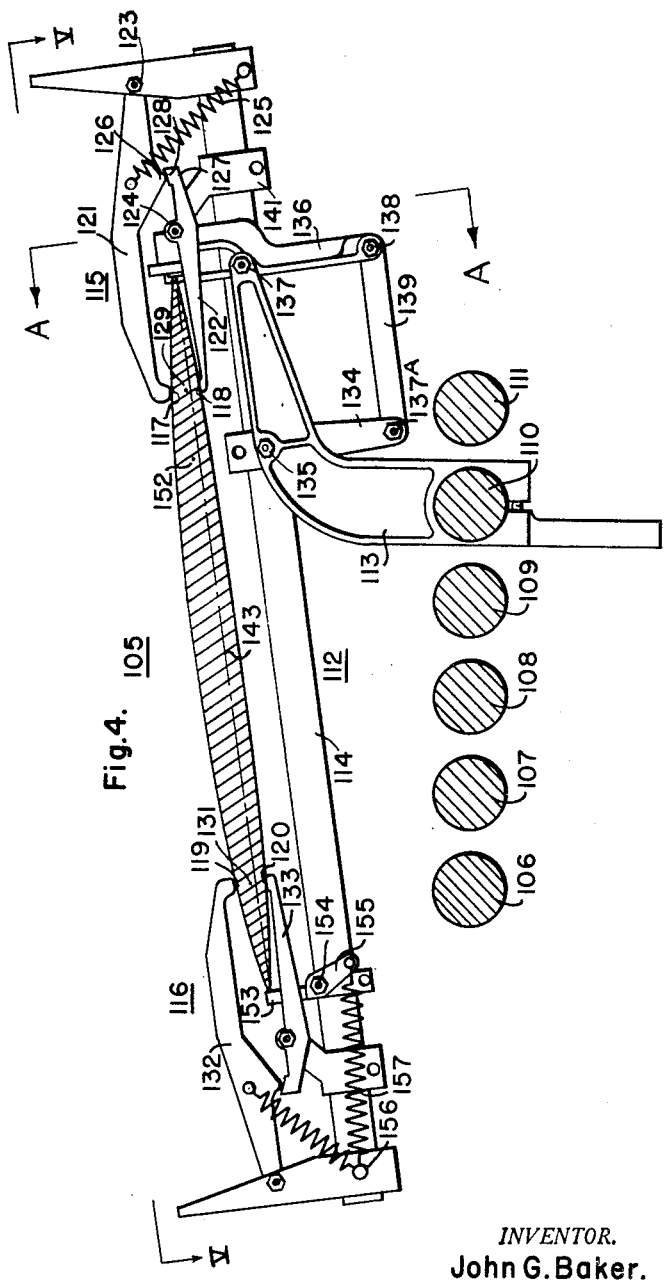

May 19, 1953
J. G. BAKER
2,638,680
AVERAGING PROTRACTOR FOR MATCHING
AIRCRAFT PROPELLER BLADES
Filed May 7, 1947
4 Sheets-Sheet 3
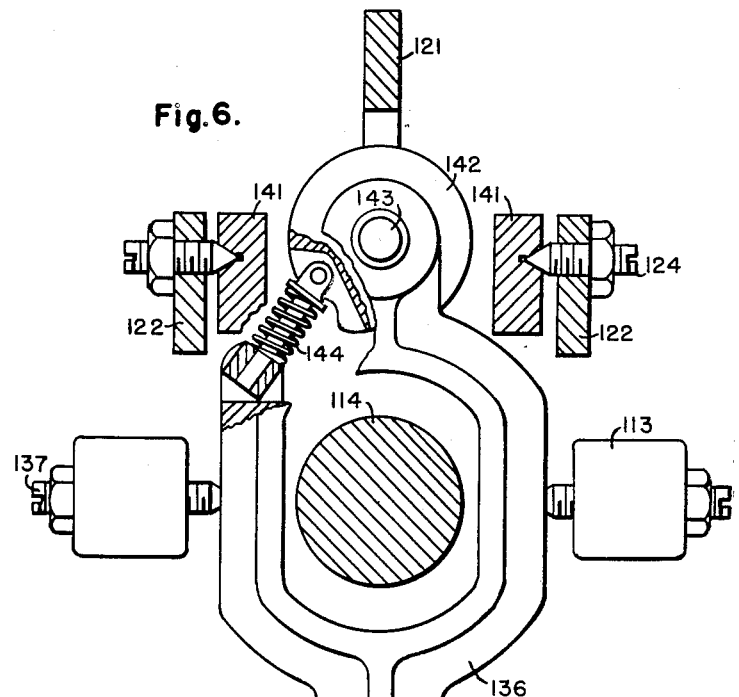
Fig. 6.
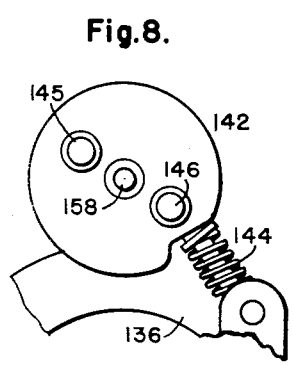
Fig. 8.
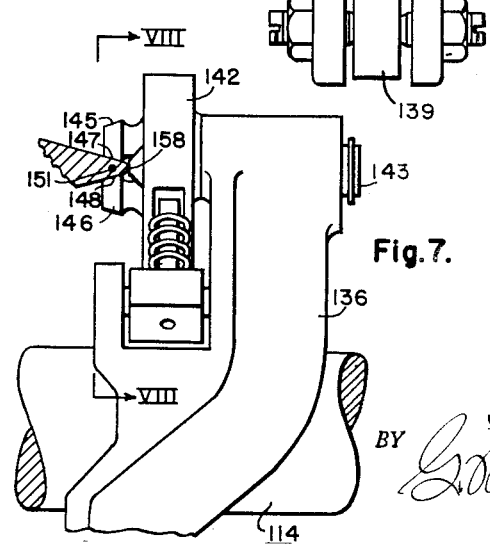
Fig. 7.
INVENTOR.
John G. Baker.
BY 
ATTORNEY Patented May 19, 1953

2,638,680

UNITED STATES PATENT OFFICE 2,638,680

AVERAGING PROTRACTOR FOR MATCHING AIRCRAFT PROPELLER BLADES

John G. Baker, Evansville, Wis., assignor to Baker Manufacturing Company, Evansville, Wis., a company of Wisconsin Application May 7, 1947, Serial No. 746,468

10 Claims. (Cl. 33—174)

My invention relates, generally, to apparatus for matching aircraft propeller blades, and, more particularly, to an averaging protractor mechanism operable to indicate the correct angle settings of the blade in the hub assembly as compared to a master blade or to a blade with standard dimensions.

In the setting of aircraft propeller blades in the hub assembly, it is desirable to have all the blades at as nearly the same effective angle as possible in order to avoid aerodynamic unbalance and consequent vibration of the airplane. It is well known that because of manufacturing variations even between blades which meet ordinary manufacturing shape tolerances, it is desirable in determining the angle setting to use a weighted average of several readings of angle along the radius of the blade rather than a reading at a single radius. In addition, it may be desirable in determining the angle at a given radius position to use more than two points of the cross section outline of the blade. In other words, the blade angle setting in the hub assembly is best determined from a relatively large number of points on the blade surface. For a given number of points on the surface of the blade there will likely be both an optimum selection of the point locations as defined by radius and chord coordinates and a corresponding optimum weighing function for determining the contribution of the deviation of each point, with respect to a master blade or standard dimensions, to the weighted average used for setting the blade angle.

Furthermore, it is desirable to determine the effective angles of propeller blades by means of a mechanism which may be set up or zeroed in advance using either a master blade or standard dimensions so that in testing another blade the apparatus reads directly the difference between the blade tested and the master blade or blade with standard dimensions.

Accordingly, it is the object of my invention, generally stated, to provide a mechanism in the form of an averaging protractor for use in determining the correct angle setting of a propeller blade which shall be of simple and reliable construction, and which may be readily and economically used in the testing or inspecting of propeller blades.

More specifically it is the object of my invention to give a direct reading of a weighted average of appropriate angle readings along the radius of a propeller blade for use in setting the blade in the propeller hub so as to minimize propeller vibration due to manufacturing variations from blade to blade.

Another object of my invention is to provide a mechanism of this kind wherein a plurality of protractor elements whose angular positions with respect to the axis of the blade are determined by at least two points of the cross section outline or surface of the blade at spaced locations along the radius of the blade are used to determine the effective blade angle as compared to a master blade or to a blade with standard dimensions.

A further object of my invention is to provide a mechanism of the character described wherein a single pointer or indicator device is actuated in accordance with the weighted average of several angles along the radius of the blade by means of a plurality of protractor elements whose angular positions are determined by the angle of different sections of the blade, and which are connected to a pointer through a summation lever system which functions to multiply the angle of each protractor element by a weighing factor and adds the results.

A more specific object of my invention is to provide a mechanism for determining the correct angle setting of a propeller blade wherein the weighted average of several readings of angle along the radius of the blade is compared or matched with the weighted average of a master blade or a blade with standard dimensions.

Another object of my invention is to provide a mechanism of this kind wherein a plurality of protractor elements, whose angular positions with respect to the axis of the blade are determined by at least two points of the cross section outline or surface of the blade at spaced locations along the radius of the blade, are used to determine the effective blade angle as compared to a master blade or to a blade with standard dimensions.

Another object of my invention is to provide a mechanism of the character described wherein each of the protractor elements is individually adjustable with respect to its axis of rotation to provide for setting the mechanism to a zero or other desired reading for a master blade or for the standard dimensions of a blade.

A further object is to provide a mechanism of the character described wherein the lever system is adjustable to provide for setting the mechanism to a zero reading on a master blade or with a standard blade dimension.

A detail object of my invention is to provide a protractor element for producing a linear displacement proportional to the angular deviation from a standard at a specific radius of a propeller blade such that:

(1) The radius location at which the angular deviation is determined is accurately and conveniently reproduced in repeated testing.

(2) Small lateral deflections of or lateral errors in the blade neither affect the linear displacement produced nor the radius location at which the angular deviation is determined.

(3) The protractor element may be used singly or in groups either on a separately mounted blade or on a blade installed in a propeller.

(4) The change from use on a propeller blade of one design to one of another can be made by relatively simple adjustments.

(5) The relation between the angular deviation and the linear displacement produced is precise.

(6) The linear displacement produced can be located for simple connection to a lever computor.

Another object of my invention is to provide an integrator in the form of a lever system for determining the effective angle of a tangential blade section.

These and other objects of my invention will become more apparent from the following detailed description when considered in conjunction with the drawing, wherein:

Figure 1 is a schematic view of a protractor mechanism embodying the principal features of my invention, Fig. 2 is a schematic view of the end portion of one of the protractor elements, Fig. 3 is a partial schematic view showing a modification of the mechanism in Fig. 1, Fig. 4 is a side elevational view of an integrator for use in determining the effective angle of a blade section, Fig. 5 is a top plan view of the device of Fig. 4, Fig. 6 is an end cross-sectional view at section AA of Fig. 4 as viewed in the direction of arrows AA, Fig. 7 is an enlarged view of a portion of the mechanism of Fig. 4 showing the manner in which the trailing edge of the blade is engaged, Fig. 8 is a partial view taken along lines VIII—VIII of Fig. 7, and Fig. 9 is an idealized diagram for the purpose of illustrating the theory of propeller blade matching on the basis of which the design dimensions of my invention are determined.

In practicing my invention, in one form thereof, the mechanism comprises a support member for rotatably supporting a propeller blade in a predetermined position, usually in a flatwise horizontal position. It also comprises a plurality of protractor elements individually and adjustably mounted for partial rotation about an axis which may coincide with the extended axis of rotation of the blade. Each protractor element has an end portion which extends transversely of the blade and carries at least two spaced contact points or buttons which engage the surface of the blade at predetermined points, so that the blade angle at that particular section determines the angular position of the protractor element and gives its opposite end a corresponding displacement. The protractor elements are mechanically connected at their opposite ends to an indicator or pointer provided with a scale through a lever system which functions to multiply each displacement by a weighing factor and adds the results. The summation is indicated by the pointer. If desired, a separate pointer and scale may be utilized with each protractor element to give separate indications of the angles at the several blade sections. Each of the protractor elements is adjustably mounted so that its individual pointer may be set to an initial zero position as determined by a master blade or by standard dimensions. In addition, the lever system is provided with an adjustable lever or link for setting the main pointer on an initial or zero position as determined by the weighted average of the master blade or from standard dimensions. By means of this arrangement, it is possible to place a master blade in the rotatable support and adjust its angular position until all of the protractor elements become effective and then set the indicator on a predetermined position, such as zero. When the master blade is removed and a blade to be tested or inspected is attached to the support and rotated until the indicator gives a zero indication, the angle to which the blade has been rotated is the effective angle setting of the blade. This angular position or setting of the blade in the support may be marked in any suitable way to guide in the installation of the blade in the hub assembly. When the standard dimensions are used, the protractor elements are blocked to fix their angles at the angles called for by the standard, otherwise the procedure is the same as with a master blade.

Referring to the drawings, there is shown an embodiment of my invention in schematic form illustrating fully the principle thereof and its operation. Before describing the mechanism in detail, it is desired to point out that, as viewed in Fig. 1, it may be considered that the blade and the protractor elements engaging the blade are mounted in the same horizontal plane and have been rotated forwardly through an angle of 90 degrees to the position shown for the purpose of illustration. That is, the normal position of the blade and protractor elements is horizontal instead of vertical, as shown, with the transverse end portions of the protractor elements extending under the blade and being held in position thereon by some such arrangement as shown in Fig. 2.

The mechanism comprises a plurality of protractor elements 10 through 15 which may be made up in several shapes.

Since all of the protractor elements are substantially the same as to form, only one will be described in detail. Referring to the element 10 it comprises a pair of parallel arm or end portions 18 and 19 connected by a shaft or stem portion 20 so as to provide a rigid member. The arm portion 18 is disposed to extend transversely of the blade at one section $a$ thereof and carries contact members or buttons 21 and 22, the buttons 21, 22 and the shoulder 52, Fig. 2, are held against the face and edge of the blade respectively, as will be described below so that the lateral location of the end portion 18 is determined by the blade location at $a$. The other arm portion 19 also extends transversely across the extended center line or axis of rotation of the blade and is pivotally or rotatably mounted by a ball and socket arrangement 23 comprising a ball portion 24 on the protractor element proper engaging a rigid support 25. As shown, the arm portion 19 is offset so that its free end 26 moves in a plane extending through the center of the ball 23.

It is readily seen with this arrangement that the rise or fall of 26, i. e. movement perpendicular to the plane of the paper, is determined by the rotation of the blade section $a$ about the blade axis and is independent of other rotations and lateral displacements of the blade so long as they are small. It is also readily seen that one blade can be removed and another inserted without the need of relocating the radius positions of the protractor contact buttons since the fixed locations of the sockets such as 25 in combination with the rigid connections such as 20 prevent significant radial movement of the contact elements.

The other protractor elements 11 through 15 are of substantially the same construction as 10, except that in this instance they are progressively shorter and all are mounted in a manner similar to that described in connection with the protractor element 10. Their transverse end portions 31 through 35 are also provided with spaced contact buttons 36—37 to 44—45 inclusive, engaging the blade surface at sections b, c, d, e and f, as shown. Their free ends 46 through 50 move similarly to the free end 26 of the element 10.

Referring to Fig. 2, it will be observed that the contact button 21 is positioned on a support member 51 which may be adjustably secured in any suitable manner adjacent the free end of the transverse portion 18. The inside surface or face 52 of member 51 is wedge-shaped so as to engage the edge of the blade and the contact button 21 in engagement with the blade surface. At the other end of the transverse portion 18, there is provided a spring biased holder 53 also having a wedge-shaped inner face 54 for engaging the opposite edge of the blade to hold the contact button 22 in engagement therewith. The holder 53 and contact button 22 are also adjustably mounted for movement along the transverse portion 18 to provide for properly positioning the contact buttons on blades of different size or width.

While it may be desirable to utilize more points of contact or engagement on the blade surface to determine its section angle, the arrangement shown in Fig. 2 is sufficient for practical purposes and to clearly illustrate the functioning of the mechanism. If, however, there are appreciable errors in the section shape of the blades that are to be tested or inspected, it may be desirable to use a different arrangement from that shown in Fig. 2, in order to obtain an angular movement of the protractor element more accurately representative of the aerodynamic behavior of the blade section. One example of an arrangement of this kind is shown in Figs. 4, 5, 6, 7 and 8 and will be described in detail following the complete description of the protractor mechanism.

Referring again to Fig. 1, and assuming that all of the free ends 26, 46 to 50, inclusive, of the protractor elements are in the horizontal position instead of the vertical position shown, it will be understood that these ends or points, as they may be referred to, will assume different positions corresponding to the angle positions of the different blade sections as determined by the protractor elements. In other words, if the protractor elements have been set or zeroed by the use of a master blade or standard dimensions, these ends or points will be displaced an amount which is proportional to the difference between the master blade or standard dimensions and the blade being inspected.

In order to provide for obtaining or determining the weighted average of all the angular displacements of the several points 26, 46 through 50, these points are connected through a lever system 60 to an indicator device 61 having a movable pointer 62 and a scale 63.

As shown, the lever system comprises a pair of end levers 64 and 65, a pair of intermediate levers 66 and 67 and a main or master lever 68. Each end of the end levers 64 and 65 is mechanically connected through connecting rods 71—72 and 73—74 to the points 46, 47, 50 and 26. That is, to the ends of the end pairs of protractor elements. The connector members 71, 72, etc., are shown in dotted form to indicate that there is a change in direction of the connection between the ends of the protractor elements and the levers from that shown in the drawing. In other words, the lever system operates in a plane at right angles to the general plane of operation of the protractor elements as described hereinbefore.

The points 48 and 49 of the two inside protractor elements are connected to the inner ends 75 and 76 of the intermediate levers 66 and 67 by means of connecting rods 77 and 78. The outer ends of these intermediate levers are connected intermediate the ends of the end levers by means of connecting rods 79 and 80.

The intermediate levers 66 and 67 are connected intermediate their ends to the ends of the main lever 68 by means of connecting rods 81 and 82. The midpoint of the main lever is connected through a rod 83 to the movable pointer 62 which is rotatably mounted on a fixed support 84.

This arrangement, in mathematical terms, multiplies each of the vertical displacements of the points 26, 46 through 50 by a proper weighing factor and adds the results. The magnitudes of the weighing factors and the radii of the sections $a$ through $f$ are selected in such a way as to make the deflection of the pointer 62 a measure of the effective angle of the blade. The basis of such selections is given below following the heading Theory of Matching.

Denoting the weighing factors are $f_1, f_2, f_3, \ldots f_6$ and the corresponding angular deviations from the master blade or design dimensions are $x_1, x_2, x_3, \ldots x_6$, then the sum $$x_1f_1 + x_2f_2 + x_3f_3 \ldots + x_6f_6$$

is performed. In the design of the apparatus, the weighing factors $f_1, f_2, f_3 \ldots f_6$ depend on the length dimensions and arrangement of the various levers of the system as described below under the heading Theory of Matching. The indication of the pointer 62 on the scale 63 is proportional to the weighted average of all the angular displacements of the sections $a$ through $f$. Therefore, it will be readily understood that if the apparatus is set to a predetermined reading which may be zero, by the use of the master blade or standard dimensions, it can be used to indicate when a blade being inspected is set in such a position as to make the weighted average of the inspected blade correspond to that of the master blade or to that of standard dimensions.

Referring to Fig. 3, there is shown a modification of the mechanism of Fig. 1, wherein provision is made for readily adjusting the mechanism to zero position as regards the setting of the pointer 62 on the scale, and also as regards the setting of the pointers individual to each of the protractor elements. In this view only a portion of the lever system 60 is shown.

In addition to the main indicator device 61, as shown in Fig. 1, an individual indicator 85 may be utilized to indicate directly the angle of each of the protractor elements. One of these indicators is shown in Fig. 3, but it is to be understood that each of the other protractor elements may be provided with a similar indicator device.

In order to adjust the individual indicator devices 85 when using a master blade, it is desirable to be able to adjust each of the individual supports of the protractor elements, that is, the support 23 of Fig. 1.

As will be readily apparent from Fig. 3, the ball and socket arrangement 23 of Fig. 1 may be replaced by a more elaborate mounting wherein the form of the protractor element is somewhat changed.

In this instance, the protractor elements are in two parts, the shank portion 90 being connected to the end portion 91 by means of a universal joint 92 (sometimes called a Hooke's joint). 92 is made up of a crotch 92A, which is a part of 90, pivoted at 92D on the cross-like member 92C. 92C in turn is pivoted at the axis 92E on the crotch 92B which forms a part of 91. The two pivot axes are at 90 degrees with each other. The universal joint serves to permit rotation of 90 with respect to 91 either about 92E or 92D, but rigidly connects 90 to 91 for rotation about the axis of the bearings 95 and 96.

The bearings 95 and 96 serve to pivotally support the shaft extension portion 93 of 91 in the adjustable support 94.

It will be noted that with 94 stationary the rise or fall of the point 60A is related to movement of 90 the same as the rise and fall of 26 is related to the movement of 20. The support 94 is pivotally secured at one end 97 to a fixed support 98 and is adjustably supported at its other end by means of a threaded screw or other suitable device 99 resting on a fixed support 100.

Consider now that the other end of 90, which is not shown but is similar to 18, and the other similar protractor elements are in contact with a master blade or are blocked in positions corresponding to standard blade dimensions. The pointer 62 will now be in some fixed position. Suppose it is desired to adjust the position of 62. 90 cannot be rotated about the blade axis because of its contact with the blade at its other end. 90 is connected through 92 to 91. 92 prevents relative rotation between 90 and 91 about the blade axis so that 91 cannot rotate. If 99 is adjusted up 94 must move 93 up about one-half as much because 94 is pivoted to the stationary support 98. Since 91 cannot rotate 60A must move up the same amount that 93 moves up. Hence 62 moves to the right. Thus with the blade contacts fixed 62 can be zeroed or otherwise adjusted.

In order to provide a way of zeroing the main indicator 61, the lever system 60 may be provided with an additional adjustable lever 101 which is interposed between the main lever 68 and the movable pointer 62. One end of this lever 101 is pivotally attached at 102 to a vertically adjustable support 103. It will be apparent that by adjusting the position of the support 103, the pointer 62 may be accurately adjusted on the scale 63.

Referring now to Figs. 4, 5, 6, 7 and 8, there is shown an integrator in the form of a lever mechanism 105 for obtaining an angle reading or setting of a blade section by using 6 points of contact with the blade surface instead of only two points as in the case of the apparatus shown in Figs. 1 and 2. It is to be understood that a lever system of this kind is a part of each of the protractor elements 10 through 15 of Fig. 1 and replaces their transversely extending arm portions 18 and 31 through 35 carrying the spaced apart contact buttons. Thus the shaft or shank portions of the protractor elements are illustrated as shaft members 106 through 111 in Fig. 4. Only the shaft member 110 is shown in Fig. 5. The lever mechanism 105 is attached to the shaft 110 and functions, when applied to the blade as shown, to determine the angular position of the shaft corresponding to the angle of the blade section. The aerodynamic theory on which this mechanism is based is reviewed below under the heading, Theory of Integration at a Blade Section.

The lever mechanism comprises a frame, indicated generally by the numeral 112, which is attached to the shaft member 110 by an arm member 113 clamped thereon as shown. The frame 112 comprises a cross member 114 on which is mounted at the ends pairs 115 and 116 of pivotally mounted cooperating levers for engaging opposite surfaces of the blade section at four contact points, 117, 118, 119 and 120.

Considering first the pair of levers 115, the levers 121 and 122 are hinged to the frame at points 123 and 124. A pair of springs 125 bias the lever 121 counterclockwise about its pivot point 123 so that its free end presses against the blade at point 117 and through the blade on lever 122 at point 118, thus raising the right-hand end of the frame until portion 126 of lever 121 engages the opposite end 127 of lever 122 at point 128.

If point 129 is imagined rigidly attached to the frame 112, the movements just described force the point 129 to a position midway between points 117 and 118 because of the dimensions selected between contact point 118 and hinge point 124, between hinge point 124 and point 128, between contact point 117 and point 128, and between point 128 and hinge point 123.

Considering the other pair of levers 116, a point 131 can be imagined attached to the frame 112 and forced to a position midway between the contact points 119 and 120 of fingers 132 and 133 which are mounted and function in the same manner as fingers 121 and 122. Accordingly, the frame 112 can be thought of as located by the two points 129 and 131 attached in imagination to the frame.

The frame 112 is attached to the arm member 113 by a member 134 having one end rigidly secured to the cross member 114 and pivotally secured at 135 to the arm member 113. A member 136 is pivotally secured at 137 to the end of member 113 and the lower ends of members 134 and 136 are pivotally connected together at points 137A and 138 by a link 139.

The member 136 has an eye or eye-shaped end portion 141 through which the cross member 114 extends but does not touch and carries an element 142 which is pivotally mounted on the end portion of 136 about an axis 143 which is approximately parallel to the chord of the blade. Referring to Fig. 6, element 142 is biased by a spring toggle mechanism 144 in a clockwise direction, as viewed in Fig. 4 at section AA looking in the direction indicated. As shown in Fig. 7, element 142 is crotchlike in shape having one prong 145 extending over the top of the blade and the other prong 146 extending under the bottom of the blade so that when element 142 is rotated about its axis, prong 145 is forced into contact with the blade surface at point 147 and prong 146 at point 148. A point 151 can be imagined attached to member 136 on the axis of element 142. The rotation of 142 causes its contact prongs to engage the top and bottom surfaces of the blade and forces the point 151 to a position midway between contact points 147 and 148.

The distance between the pivot points 137A and 138 of link 139 equals the distance between the pivot points 135 and 137. Another point 152 can be imagined attached to member 134 located on a line passing through pivot points 135 and 137A and on a straight line extending between points 129 and 131. The shape of member 136 and element 142 is such that the point 151 lies on a straight line extending through pivot points 137 and 138. Since the member 136 is rigid, the distance between point 151 and pivot point 137 is constant. Accordingly, the angle assumed by the arm member 113 is the angle of a line extending between points 152 and 151 which is the angle that it is desired to use as characteristic of the angular position of the blade as shown below under the heading Theory of Integration at a Blade Section.

Referring to Fig. 4, a member 153 is rotatably mounted on axis 154 and is provided with an actuating arm 155 connected at 156 to the frame by springs 157. Member 153 presses against the edge of the blade so as to locate the mechanism in a chord-wise direction against a stop 158 (Fig. 7) contained in element 142.

To remove the blade, 132 is manually rotated counter-clockwise until the center line of its biasing spring passes its pivot axis. Under this condition, 132 remains when released approximately upright. Similarly, 121 is manually rotated clockwise until its biasing spring passes its pivot axis and retains it nearly upright. Next referring to Fig. 8, 142 is manually rotated clockwise until the center line of 144 passes the pivot axis of 142 and 142 when released remains in a position without pressure between 145, 146 and the blade. Finally 153 is moved away from the blade until its biasing spring holds it in a position removed from the blade. The mechanism is no longer supported by the blade and the blade may be removed.

To install the next blade for test the above sequence is reversed.

THEORY OF MATCHING AIRCRAFT PROPELLER BLADES TO IMPROVE OPERATING BALANCE

I. Introduction

Differences between individual blades constitute only one of several classes of propeller non-symmetry capable of producing vibration. Thus if it were possible to perfectly match propeller blades and to give them perfect pitch angle settings in the hub, there would still be significant nonsymmetry in general due to (1) discoincidence of the inertia and rotating axes of the hub; i. e., dynamic unbalance of the hub, (2) errors in the directions of the axes and radii of the hub blade fits, and (3) elastic nonsymmetry of the hub. However, with perfectly matched blades and pitch settings, (1), (2), and (3) could be corrected, except for secondary effects, for one operational speed and all air densities by mass adjustments.[1] Furthermore, if (2) and (3) are small, which is likely, unbalance at one speed would remove (1) and the propeller would be very close to balance for all speeds and all air densities.

In other words, matching of blades and accurate pitch angle setting in the hub would be expected to reduce unbalances arising from aerodynamic forces permitting a greater refinement in running balance with subsequent shop and field balancing operations.

[1] Differences in twisting deflection of the blade due to differences in bending arising from centrifugal force and (2) is an example of a secondary effect.

II. Differences Between Blades

Blade differences may be classified as follows:
(a) Differences in distribution along the radius of the angle of zero lift.
(b) Differences in section aerodynamic characteristics other than the differences in the angle of zero lift.
(c) Differences in lateral position of sections of the same radius.
(d) Differences in mass distribution with a given static moment about the propeller axis.
(e) Differences in static moments about the propeller axis.
(f) Differences in bending stiffness distribution along the radius.
(g) Differences in twisting stiffness distribution along the radius.
(h) Differences in the material modulus.
(i) Differences in material density.

Obviously the more classes of differences that are taken into account in the specification of blades, the greater the difficulty of meeting the specification with all blades or of selecting matched sets of blades according to specification. It is, therefore, important to drop consideration of as many classes of differences as seems permissible. With the present manufacturing tolerances it seems permissible to neglect (b), (c), (e), (g), (h), and (i), so that (a), (d), and (f) are all that remain. The effects of (d) and (f) are interrelated so that they are treated together below.

III. Unbalances Arising From Differences in the Distribution in the Angle of Zero Lift

A. *Proof of superposition theorem*

If an elemental geometric error A in a blade produces an unbalance effect $a$ and a second elemental geometric error B produces an unbalance $b$, then both errors A and B present simultaneously will produce an unbalance effect $a+b$. This will be designated the Superposition Theorem and must be applicable if a weighted average of errors is to be a measure of the effective angle of a propeller blade. Let it be assumed:

(1) That the center line of the undistorted blade is straight and radial,
(2) That there is no twisting deformation or initial twist in the blade,
(3) That the blade is infinitely stiff flatwise,
(4) That aerodynamic forces are exerted perpendicular to the stiff direction of the blade,
(5) That the aerodynamic force on an elementary portion of the blade between any two planes perpendicular to the center line of the blade is the same as it would be for two dimensional flow.
(6) That the center of gravity of any portion of the undistorted blade between two planes perpendicular to the center line of the blade is on the center line of the blade, and
(7) That the deflection of the blade is constant with respect to time.

Referring to Fig. 9, the centrifugal force on a blade element between two tangential sections, $dr_a$ apart is $\omega^2 r_a \rho dr_a$ where $\omega$ is the rotational speed of the propeller, $r_a$ is the radius of the section in the direction of the undistorted blade center line, and $\rho$ is the mass per unit radius of the blade.

For convenience, consider the force $\omega^2 r_a \rho dr_a$ divided into two components, $C_r = \omega^2 r_a \rho dr_a$ parallel to R and passing through the center of the section, and $C_t = y_a \omega^2 (\sin \eta) \rho dr_a$ perpendicular to R parallel to the plane of the propeller and passing through the center of the section. Further, consider $C_t$ subdivided into two components both in a plane perpendicular to R, $$C_{ty} = y_a (\sin^2 \eta) \omega^2 \rho dr_a$$

in the direction Y and $C_{tz}$ in the direction Z.

The bending moment about a section at a given radius $r_b$ due to centrifugal force and the deformation $y_a$ is that due to $C_r$ plus that due to $C_{ty}$ or, ($C_{tz}$ exerts no bending moment).

$$\omega^2 \left[ \sin^2 \eta \int_{r_b}^{R} y_a (r_a - r_b) \rho dr_a - \int_{r_b}^{R} (y_a - y_b) r_a \rho dr_a \right] \quad (1)$$

whereby $y_b$ is the deflection at a radius $r_b$ and R is the overall blade radius.

With a force P applied in the Y direction at the radius $r$ the moment due to P for any radius from $$r_b = 0 \text{ to } r_b = r \text{ is } P(r - r_b) \quad (2)$$

Equating the external moments (1) and (2) to the elastic internal moment for the interval $r_b = 0$ to $r_b = r$ results in, $$P(r - r_b) + \omega^2 \left[ \sin^2 \eta \int_{r_b}^{R} y_{ap}(r_a - r_b) \rho dr_a - \int_{r_b}^{R} (y_{ap} - y_{bp}) r_a \rho dr_a \right] = EI \frac{d^2 y_{bp}}{dr_b^2} \quad (3)$$

where $y_{bp}$ and $y_{ap}$ are the $y_b$ and $y_a$ corresponding to the loading in question, E is Young's modulus, and I is the moment of inertia of the section of $r_b$ radius. The equilibrium of internal and external moments between $r_b = r$ and $r_b = R$ gives $$\omega^2 \left[ (\sin^2 \eta) \int_{r_b}^{R} y_{ap}(r_a - r_b) \rho dr_a - \int_{r_b}^{R} (y_{ap} - y_{bp}) r_a \rho dr_a \right] = EI \frac{d^2 y_{bp}}{dr_b^2} \quad (4)$$

With a force P' applied instead of P in the direction of Y at a radius $r'$ where $r' > r$ the bending equilibrium equation between $r_b = 0$ and $r_b = r'$ will be $$P'(r' - r_b) + \omega^2 \left[ (\sin^2 \eta) \int_{r_b}^{R} y_{ap'}(r_a - r_b) \rho dr_a - \int_{r_b}^{R} (y_{ap'} - y_{bp'}) dr_b \right] = EI \frac{d^2 y_{bp'}}{dr_b^2} \quad (5)$$

The equation between $r_b = r'$ and $r_b = R$ will be $$\omega^2 \left[ (\sin^2 \eta) \int_{r_b}^{R} y_{ap'}(r_a - r_b) dr_a - \int_{r_b}^{R} (y_{ap'} - y_{bp'}) r_a dr_a \right] = EI \frac{d^2 y_{bp'}}{dr_b^2} \quad (6)$$

where $y_{ap'}$ and $y_{bp'}$ are respectively the $y_a$ and $y_b$ with P' applied. With both P and P' applied at $r$ and $r'$ respectively, the bending between $r_b = 0$ and $r_b = r$ gives $$P(r - r_b) + P'(r' - r_b) + \omega^2 \left[ (\sin^2 \eta) \int_{r_b}^{R} y_{app'}(r_a - r_b) \rho dr_a - \int_{r_b}^{R} (y_{app'} - y_{bpp'}) r_a \rho dr_a \right] = EI \frac{dy^2_{bpp'}}{dr_b^2} \quad (7)$$

where $y_{bpp'}$ and $y_{app'}$ are the $y_b$ and $y_a$ respectively with both P and P' applied. From $r_b = r$ to $r_b = r'$, the bending equation will be $$P'(r' - r_b) + \omega^2 \left[ (\sin^2 \eta) \int_{r_b}^{R} y_{bpp'}(r_a - r_b) \rho dr_a - \int_{r_b}^{R} (y_{app'} - y_{bpp'}) r_a \rho dr_a \right] = EI \frac{d^2 y_{bpp'}}{dr_a^2} \quad (8)$$

From $r_b = r'$ to $r_b = R$ the bending equation is $$\omega^2 \left[ (\sin^2 \eta) \int_{r_b}^{R} y_{bpp'}(r_a - r_b) \rho dr_a - \int_{r_b}^{R} (y_{app'} - y_{bpp'}) r_a \rho dr_a \right] = EI \frac{dy^2_{bpp'}}{dr_b^2} \quad (9)$$

Adding (3) and (5) term by term $$P(r - r_b) + P'(r' - r_b) + \omega^2 \left[ (\sin^2 \eta) \int_{r_b}^{R} (y_{ap} + y_{ap'})(r_a - r_b) \rho dr_a - \int_{r_b}^{R} [(y_{ap} + y_{ap'}) - (y_{bp} + y_{bp'})] r_a \rho dr_a \right] = \frac{EI d^2 (y_{bp} + y_{bp'})}{dr_b^2} \quad (10)$$

(1) applies from $r_b = 0$ to $r_b = r$. Adding (4) to (5) term by term $$P'(r' - r_b) + \omega^2 \left[ (\sin^2 \eta) \int_{r_b}^{R} (y_{ap} + y_{ap'})(r_a - r_b) \rho dr_a - \int_{r_b}^{R} (y_{ap} + y_{ap'}) - (y_{bp} + y_{bp'}) r_a \rho dr_a \right] = \frac{EI d^2 (y_{bp} + y_{bp'})}{dr_b^2} \quad (11)$$

(11) applies from $r_b = r$ to $r_b = r'$. Adding (4) to (6) term by term $$\omega^2 \left[ (\sin^2 \eta) \int_{r_b}^{R} (y_{ap} + y_{ap'})(r_a - r_b) \rho dr_a - \int_{r_b}^{R} [(y_{ap} + y_{bp'}) - (y_{bp} + y_{bp'})] r_a \rho dr_a \right] = EI \frac{d^2(y_{bp} + y_{bp'})}{dr_b^2} \quad (12)$$

(12) holds from $r_b = r'$ to $r_b = R$. From (10), (11), and (12), it is seen that $y_{bpp'} = y_{bp} + y_{bp'}$ satisfies the Equations 7, 8, and 9. Since the boundary conditions are also satisfied by $y_{bpp'} = y_{bp} + y_{bp'}$, $y_{bp} + y_{bp'}$ is the solution for the deflection and the principle of superposition is established.

B. *Moment unbalance*

If the $y_{bp}$ satisfying (3) is found, then the moment [1] at $r_b = 0$ in the plane of the propeller perpendicular to R is:

$$m_p = P(\cos \eta) \left[ r - \omega^2 \int_0^R \frac{y_{ap}}{P} r_a \rho dr_a \right] \quad (13)$$

The moment about R $$m_R = \omega^2 (\sin^2 \eta \cos \eta \int_0^R y_{ap} dr_a \quad (14)$$

The integral term in (14) divided by the integral term in (13) gives a term of the order of $y_{ap} r_a$ which is small compared to one hence $m_R$ will be neglected in comparison with $m_p$.

---
[1] The location of the moment vector is described.

Applying the principle of superposition, $$\frac{y_{ap}}{P}$$

is a function of $r$ and $r_a$ so that $Z(r)$ may be defined by $$Z(r) \equiv \int_0^R \frac{y_{ap}}{P} r_a \rho \, dr_a \qquad (15)$$

Combining (13) and (15)

$$m_p = P(\cos \eta)[r - Z\omega^2] \qquad (16)$$

If $P$ is due to an error in angle, i. e., deviation from a master blade or a blade with standard dimensions, of an element at a radius $r$, the $P$ may be expressed as:

$$P \equiv vcx \, dr \qquad (17)$$

where $c$ is the chord at radius $r$, $x$ is the error in angle and $v$ is the coefficient defined by (17). $v$, $c$, and $x$ are each functions of $r$. In addition, $v$ will depend on the flow velocity, the air density, and general aerodynamic conditions, as well as the number of blades in the propeller.

With $P$ as given by (17) $m_p$ is only an infinitesimal part of the total moment due to the error $x(r)$. The total moment will be denoted by $M$. That is $m_p = dM$ and the combination of (16) and (17) gives:

$$dM = vcx(\cos \eta)[r - Z\omega^2] \, dr \qquad (18)$$

or the total moment resulting from the error $x(r)$ is $$M = (\cos \eta) \int_0^R vcx[r - Z\omega^2] \, dr \qquad (19)$$

which may be written $$M = \int_0^R \varphi(r) x(r) \, dr \qquad (20)$$

where $$\varphi(r) = vc[r - Z\omega^2] \cos \eta \qquad (21)$$

C. *The determination of Z*

With the solution of (3) and (4) for $y_{bp}$, $Z$ can be found from (15). Unfortunately (3) and (4) can only be solved on an approximate basis. To obtain a first approximation for the solution of (3) and (4), the following procedure is suggested:

First express $y_{bp}$ as $$y_{bp} = y_r \, u(r, r_b) \qquad (22)$$

where $u$ is the static deflection curve for a fixed magnitude of force $P$ at various radii $r$ and with no other force acting on the blade. Second, substitute $y_{bp}$ as given by (22) in (3) setting $r_b = 0$ and solve for $y_r$ for each of several values of $r$. Third, these values of $y_r$, together with (22) give an approximate expression for $y_{bp}$ in terms of $r$ and $r_b$.

A second approximation could conceivably be carried through by using the centrifugal loading on the blade with the deformation (22) as a means of determining a new form of deflection curve; but for the purpose at hand a first approximation is believed adequate. A better first approximation might be obtained by choosing an alternative expression in place of (22) for $y_{bp}$.

D. *Force unbalance*

The unbalanced force in the plane of the propeller is also of interest. Referring to Fig. 9, the resultant force in the direction of $R$ due to centrifugal force is:

$$\omega^2 \int_0^R r_a \rho \, dr_a \qquad (23)$$

Since (23) is determined by the static moment about the propeller axis, it will be omitted from consideration as explained in II above.

$J_p$, defined as the resultant force perpendicular to $R$ in the plane of the propeller due to the force $P$ directly and due to the deflection $y_{bp}$ resulting from $P$, is $$J_p = P(\sin \eta)\left[1 + \omega^2 \int_0^R \frac{y_{ap}}{P} \rho \, dr_a\right] \qquad (24)$$

$Z_f(r)$ may be defined by (compare to 15)

$$Z_f(r) \equiv \int_0^R \frac{y_{ap}}{P} \rho \, dr_a \qquad (25)$$

Let $F$ denote the force on the blade in the plane of the propeller due to the angular error $x(r)$. With $P$ given by (17) $J_p$ is an infinitesimal part of $F$ that is $dF$. (24) becomes $$dF = vcx(\sin \eta)[1 + \omega^2 Z_f] \, dr \qquad (26)$$

or $$F = (\sin \eta) \int_0^R vcx[1 + \omega^2 Z_f] \, dr \qquad (27)$$

or $$F = \int_0^R \varphi_f(r) x(r) \, dr \qquad (28)$$

where $$\varphi_f(r) = vc[1 + \omega^2 Z_f] \sin \eta \qquad (29)$$

E. *Method of force and moment balancing*

Since the expression for moment unbalance (20) and the expression for force unbalance (28) are similar, a method of measurement worked out for one will apply in principle to the other.

Consider (20). It is planned to select an angular position of the whole blade at which $M$ is zero. It is, therefore, only necessary to produce an indication proportional to $M$.

It will be seen in the following, as might be expected, that the indication desired amounts simply to the indication of a weighted average of measurements of $x(r)$.

The indication of a quantity proportional to $M$ by instrument could be more accurate, the greater the number of radii at which $x(r)$ is measured. However, since apparatus complication is a disadvantage, it is important to select the optimum radii for measurement with a given number of measuring stations. With this done, it is, of course, necessary to determine the proper weighting factor for each measurement to be used in formulating the summation approximating (20) on which the indication should depend.

To these ends Gauss' rule is applicable. In applying Gauss' rule to the approximate evaluation of (20), it is assumed: (1) that the best results will be obtained by integrating with respect to that function of $r$ rather than $r$ itself, which will result in the least probable variation in the integrand, and (2) that the probable error in angle at all radii is the same. It follows that the integration shoud be performed with respect to $\beta(r)$ where $d\beta$ is defined by $$d\beta = K_1 \varphi \, dr \qquad (30)$$

in which $K_1$ is a constant.

This may be shown by substituting (30) in (20) with the result:

$$M=\frac{1}{K_1}\int_0^{\beta_R} x(r)d\beta \qquad (31)$$

where $\beta_R$ is the value of $\beta$ for $r=R$

Integrating (30) to determine $\beta$ $$\beta=K_1\int\varphi dr+K_2 \qquad (32)$$

where $K_2$ is a constant of integration.

With $\beta_R=1$, $K_1$ and $K_2$ can be determined and (32) becomes:

$$\beta=\frac{\int_0^r \varphi dr}{\int_0^R \varphi dr} \qquad (33)$$

and from (31)

$$M=\int_0^R \varphi dr \cdot \int_0^{+1} x(r)d\beta \qquad (34)$$

The second integral factor of (34) is of the form used for Gauss' rule.

The radius locations are obtained by taking Gauss' locations measured in terms of $\beta$. At the $n$th location the magnitude of $x(r)$ is multiplied by Gauss' corresponding coefficient $f_n$. Thus the $n$th term in the summation is $$f_n \cdot x_n \qquad (35)$$

where $x_n$ is the $x(r)$ at the $n$th location.

The approximate expression for M based on Gauss' rule as applied to (34) is then $$M=\int_0^R \varphi dr \cdot \sum_{n=1}^{n=t} f_n \cdot x_n \qquad (36)$$

In which $t$ is the number of stations at which $x(r)$ is to be measured.

The integral factor in (36) is dependent on the blade design only and therefore does not vary from blade to blade. To match blades by making $M=0$ for all blades it is, of course, unnecessary to compute this factor. The summation factor of (36) is performed by the lever mechanism as described above.

For the six stations of the protractor according to Gauss' formula $$\begin{aligned}f_1=f_6=&.08566\\f_2=f_5=&.18038\\f_3=f_4=&.23395\end{aligned} \qquad (37)$$

The corresponding $\beta$'s are:

$$\begin{aligned}\beta_1=&.03376\\\beta_2=&.16939\\\beta_3=&.38069\\\beta_4=&.61931\\\beta_5=&.83060\\\beta_6=&.96623\end{aligned} \qquad (38)$$

From these $\beta$'s the corresponding $r$'s are computed from $\beta(r)$ as determined from (33).

If it is desired to match blades to give equal F's the same method is used except $\varphi_f(r)$ is used instead of $\varphi(r)$ throughout.

The comparative importance of force and moment unbalance will, of course, depend on the vibration susceptibility of the airplane. A dynamic system is perhaps possible in which a combination of force and moment unbalance would be more serious than one or the other. This possibility is not as likely nor as simply treated as it might first seem. The moment, considered as a couple, and the force both arising from errors in a blade are not co-planar and therefore cannot be treated as a single force acting at a different location along the axis of the propeller. A quantitative understanding of a specific vibrating system is evidently required for effective treatment of the question of force and moment combinations.

IV. DESIGN OF LEVER SYSTEM 60

The stations (a), (b), (c), (d), (e) and (f) Fig. 1 corresponds to $n=1, 2, 3, \ldots$ and 6 respectively in the above formula assuming their radii are selected in such a way as to satisfy (38).

The vertical movements at 46, 47, 48, 49, 50 and 26 are proportional to the errors $x_1, x_2, x_3, \ldots$ and $x_6$ respectively. The factors (37) determine the relative lengths of the levers 64 through 68.

Since the $f_1=f_6$; $f_2=f_5$ and $f_3=f_4$, the lever system of Fig. 1 is symmetrical, i. e., 64 and 66 are the mirror reflections so to speak, of 65 and 67 respectively and the distance between 81 and 82 on 68 equals the distance between 82A and 82. On this account only the stations (a), (b) and (c) need be considered.

Let the vertical movement of 74, 73 and 70 be denoted by $x_1$, $x_2$ and $x_3$ respectively. Let the vertical movement of 89 and 82A be denoted by $x_{12}$ and $x_{123}$ respectively.

Let the horizontal distance between 74 and 89, between 89 and 73, between 89 and 82A and between 82A and 76 be $a$, $b$, $c$, and $d$ respectively, then the vertical motion of 82A is:

$$x_{123}=\left[\left\{(x_1-x_2)\frac{d}{a+b}+x_2\right\}-x_3\right]\frac{d}{c+d}+x_3 \qquad (39)$$

In order to make room for the parts of the mechanism and in order that the lever arms be long enough to avoid large angular movements of the levers, the spacing between 74 and 73 and between 73 and 70 must be adequate. Let these spacings be 5 and 3 inches respectively, then $$a+b=5;\text{ and }c+d-b=3 \qquad (40)$$

From (39) and (40)

$$x_{123}=\frac{d}{3+b}\left[\frac{b}{5}x_1+\left(1-\frac{b}{5}\right)x_2\right]+\left(1-\frac{d}{3+b}\right)x_3 \qquad (41)$$

In the mechanism, the movement $x_{123}$ must depend on $x_1$ and $x_2$ with the same weighting as the ratio of $f_1$ to $f_2$ in (37); in other words, the ratio of the coefficients of $x_1$ and $x_2$ in (41) must equal the ratio of $f_1$ to $f_2$ thus $$\frac{b}{5}\left(\frac{1}{1-\frac{b}{5}}\right)=\frac{.08566}{.18038} \qquad (42)$$

or $$b=1.161'' \qquad (43)$$

substituting (43) in (40) gives $$a=3.39'' \qquad (44)$$

and (41) becomes $$x_{123}=\frac{d}{4.61}\left[\frac{1.61}{5}x_1+\left(1-\frac{1.61}{5}\right)x_2\right]+\left(1-\frac{d}{4.61}\right)x_3 \qquad (45)$$

The coefficients of $x_1$ and $x_3$ in (45) must be in the ratio of $f_1$ to $f_3$ of (37). This relation and (44) gives $$d=2.455'' \qquad (46)$$

and (43) and (46) in (40) gives $$c=2.155'' \qquad (47)$$

V. THEORY OF INTEGRATION AT A BLADE SECTION

It is well known that for low angles of attack, the slope of attack-coefficient of lift relation for thin airfoils is the same for all practical shapes. It follows that for low angles of attack the angle of attack-coefficient of lift relation is completely determined by the angle of zero lift. In accordance with the theory due to Munk (see Technical Note No. 122, National Advisory Committee for Aeronautics by Max M. Munk) the angle of zero lift for any thin practical airfoil shape is determined approximately by a weighted sum of $n$ ordinates of the mean curve of the section where (1) the ordinates are measured perpendicular to the chord of the section as ordinarily taken (2) the ordinates are located at prescribed abscissa, depending on $n$ (3) the weighing factors depend on $n$ and the prescribed abscissa.

Then in view of the above and assumption (5) Section II, the effect of the errors in the section shape on the angle of zero lift may be determined by taking the weighted sum of the errors in the ordinates of the mean curve of the section at the locations given by Munk.

The apparatus shown in Figs. 4, 5, 6, 7, and 8 in effect performs Munk's weighted sum on the section or the difference between Munk's sum for the master or standard dimension blade and the blade under test. The points on the mean curve of the section are 131, 129, and 151.

The location of the element 114 is forced to a fixed relationship to 131 and 129 by means of the lever systems 116 and 115 as described above.

The element 113 is located at a fixed relationship with respect to 152 and 151. 152 is on the straight line segment connecting 131 and 129. The distances along the chord from the leading edge of the points 131 and 129 are 10% and 90% of the chord as prescribed by Munk. The ratio of the distance between 131 and 152 to the distance 152 to 129 is 9, which is also the ratio of the weighting factors for the ordinates of 131 and 129. The ordinate of 152 divided by the distance between 152 and 151 is equal to the angle of zero lift. This quotient is also the magnitude of the angular movement of 113, since the distances between 152 and 151, between 135 and 137 and between 137A and 138 are all equal. Thus the angle of the shaft 110 to which 113 is rigidly attached is equal to the angle of zero lift and is therefore a measure of the effective angle of the section.

In view of the foregoing description of practical embodiments of my invention, it will be readily apparent that I have provided a device or mechanism which may be readily and economically used in the inspection or testing of propeller blades for determining their effective angle setting as compared to a master blade or a blade with standard dimensions.

Accordingly, the mechanism of my invention functions as a ready and practical means for determining the correct angle setting of propeller blades. It not only functions to give the correct angle setting by comparing the weighted average of the blade with that of the master blade or a blade of standard dimensions but also functions to at the same time give an indication of the section angles of the blade.

While I have disclosed the particular embodiments of my invention, it will be readily apparent to those skilled in the art that changes and modifications may be made therein without departing from the principles of the invention.

I claim as my invention:

1. An integrator for determining the effective angle at a radius position of a propeller blade or the like comprising, a frame structure including a cross member carrying opposed clamp levers at its opposite ends each adapted to grip the blade at opposite points on its opposite surfaces intermediate the edges thereof, an arm member mounted for rotation about an axis parallel to the axis of the blade in a plane transverse to the blade, and a lever system mechanically connecting the arm member and frame structure together to provide pivotal movement therebetween, said lever system including a spring biased rotatable member having prongs engaging the blade surfaces at opposite points adjacent one edge thereof, whereby the arm member is caused to assume an angular position in its plane of rotation in accordance with the angle of the section of the blade to which the frame structure is attached.

2. An integrator for determining the effective angle of a propeller blade at a given radius comprising, a frame structure, a pair of spring-biased cooperating lever members pivotally mounted at each end of the frame structure adapted to grip the opposite sides of the blade at spaced points on opposite sides of its longitudinal axis to locate the frame structure in predetermined relation to the blade transversely thereof, an arm member mounted for rotation about an axis parallel to the axis of the blade, said arm having a free end portion bent over in its plane of rotation, and a lever system pivotally connecting the arm member intermediate its ends to the frame structure, said lever system including an element adapted to contact opposite surfaces of the blade adjacent one edge thereby to cause the arm member to assume an angular position corresponding to the angle of the blade section.

3. An integrator device for determining the effective angle of a blade section at a given radius of the blade comprising, a cross member, a pair of spring-biased cooperating lever members pivotally mounted at the opposite ends of the cross member operable to clamp the blade at opposite points on its opposite surfaces intermediate the edges thereof to locate the cross member in predetermined relation to a pair of imaginary points midway between the points of contact of the lever members, an arm member mounted for rotation about an axis parallel to the longitudinal axis of the blade in a plane transverse to the blade, said arm being bent over in the direction of its plane of rotation, a first lever member rigidly secured at one end to the cross member and pivotally attached intermediate its ends to the bent arm member intermediate its ends, a second lever member pivotally attached intermediate its ends to the end of the arm member, a link member pivotally securing the lower free ends of the first and second lever members together, said link corresponding in length to the distance between the pivotal connections of said levers with the arm member and the lengths of the free ends of said levers also being equal, and a spring-biased element rotatably mounted on the opposite end of the second lever on an axis coinciding with the chord of the blade section, said element having prong portions engaging opposite points on the blade surfaces adjacent an edge thereof, whereby the arm member is caused to assume an angular position in accordance with the angle of the blade section to which the cross member is attached.

4. Apparatus for determining the hub angle setting of a propeller blade for minimum operational vibration comprising, means for supporting the blade, a mechanism including a group of protractor elements collectively mounted in predetermined relation to the longitudinal axis of the blade for individual movement, said elements having contacting portions extending transversely of the blade which move in parallel planes transversely of the blade and which may be secured to the blade at different radius locations thereof so that when said elements are secured to the blade they will individually assume angular positions corresponding to the blade angles at the various radius locations, said protractor elements having operating portions which are positioned remotely from the contacting portions and which are grouped at the remote location and which reproduce thereat the angles assumed by the contacting portions, an indicating device at the remote location disposed to be actuated by a linear motion, and a summation mechanism interconnected between the operating portions of the protractor elements and the indicating device operable to convert the various angular motion of said operating portions into a single linear motion to actuate the indicating device.

5. An integrator for determining the effective angle at a radius position of propeller blade or the like comprising, a frame structure including a cross member, clamp means mounted at opposite ends of the cross member of the frame structure for attaching it to the blade transversely thereof, said clamp means engaging the blade at two pairs of opposed points adjacent the leading and trailing edges of the blade, a shaft member mounted for rotation about an axis generally parallel to the axis of the blade, an arm member attached to the shaft member, a lever system pivotally connecting the arm member to the cross member of the frame structure, said lever system including an element secured to one of the levers of said lever system and adapted to engage the opposite surfaces of the blade at opposite points adjacent an edge thereof, whereby the frame structure is connected to the blade section at a plurality of aligned points transversely thereof and the arm member is caused to actuate its associated shaft member to an angular position in accordance with the angle of the blade section.

6. Apparatus for simultaneously determining the angles at several given radii of an aircraft propeller blade comprising, a device for supporting the blade in a predetermined position, an element at each radius for contacting the blade transversely thereof at at least two points on the blade surface, a mechanism individual to each element for rotatably supporting and locating the elements at each radius independent of all small displacement of the blade except that indicated, each of said mechanisms functioning to transmit the angle assumed by its associated element to an indicating location, an adjustable indicating device at the indicating location, a summation lever system at the indicating location connected between the indicating device and the several mechanisms to be actuated thereby for multiplying each transmitted angle by a predetermined constant and adding the results for actuating the indicating means in accordance with this sum, and manually operable means associated with the indicating device for setting the indicating device to read a predetermined magnitude for a blade with standard dimensions.

7. Apparatus for determining the hub angle setting of a propeller blade for minimum operational vibration comprising, a group of protractor elements rotatively mounted in predetermined relation for independent movement, all of which are simultaneously operable and each of which includes a portion disposed to contact the blade at a predetermined radius and each of which includes motion transmitting portions which transmit the pitch angle at the radius as determined by the angular positions assumed by the protractor elements to an indicating location substantially independent of small movements of the blade other than those affecting pitch angle, an indicator device, and a lever mechanism connected between the motion transmitting portions of the protractor elements and the indicating device for summing the transmitted motion and operating the indicator device in accordance with summation of the transmitted motions.

8. Apparatus for determining the hub angle setting of a propeller blade to give it the same effective hub angle setting as a blade of standard dimensions comprising, a device for rigidly supporting a propeller blade for rotative movement about its longitudinal axis, a mechanical protractor element having a first blade contacting portion and a second portion remotely disposed therefrom and connected therewith to move in accordance therewith, a support for said protractor element, said support being connected with said protractor element to rotatably support it in predetermined relation to the blade position, said blade contacting portion being positioned so as to extend transversely of the blade at a predetermined radius position of the blade and contact the surface of the blade at at least two positions on opposite sides of the center line thereof, said protractor element thereby operating to produce a mechanical displacement in the form of an angular motion proportional to the pitch angle of the blade at said predetermined radius position, an indicator device, and a mechanical motion transmitting means connecting the indicating device to the said second portion of the protractor element, whereby the blade may be rotated about its longitudinal axis to obtain a reading on the indicator device corresponding to that of a blade of standard dimensions.

9. Apparatus for measuring the angle at a given radius of an aircraft propeller blade independent of small movements of such blade other than that measured comprising, a device for supporting the blade in a predetermined manner, a plurality of mechanical devices each of which is disposed transversely of the blade and provided with contact elements disposed to engage the blade transversely thereof at different given radius positions at at least two points on the blade surface, a supporting mechanism for rotatably supporting and locating each of said mechanical devices in a predetermined manner at the given radius positions and for mechanically transmitting the angular displacements thereof as determined by the blade angles at the radius positions to an indicating location, a mechanical indicating device, a motion summation mechanism mechanically connected between the supporting mechanisms at the indicating location and the indicating device collectively actuated by said supporting mechanisms for converting the angular displacements transmitted thereby into a single linear motion proportional to a weighted average of all the angular displacements, thereby to actuate the indicator device in accordance with said single linear motion.

10. Apparatus for determining the hub angle setting of a propeller blade to give it the same effective hub angle setting as a blade of standard dimensions comprising, a mechanical device for supporting the blade for rotative movement about its longitudinal axis, mechanical protractor means including a plurality of individual protractor elements rotatably mounted in predetermined relation with respect to each other and the blade for independent movement, said protractor elements having blade contacting portions adapted to be secured in predetermined surface contacting relation with the blade transversely thereof at a plurality of different radius positions along the blade and operable to assume different angular positions proportional to the pitch angles of the blade, a mechanical indicating device, and a summation lever system mechanically connected between the indicating device and the protractor elements to be actuated by the protractor elements collectively for causing the indicating device to indicate a weighted average of the angular displacements of said protractor elements as determined by their angular movements when the blade is rotated about its longitudinal axis, whereby the blade may be rotated to an angular position about its longitudinal axis such that the reading of the indicator means corresponds to that of a blade of standard dimensions.

JOHN G. BAKER.

References Cited in the file of this patent

UNITED STATES PATENTS

| Number | Name | Date |
|---|---|---|
| 1,806,756 | Harding | May 26, 1931 |
| 1,862,008 | Crocker | June 7, 1932 |
| 2,000,281 | Godfrey | May 7, 1935 |
| 2,011,931 | Dreyer | Aug. 20, 1935 |
| 2,016,420 | Engst | Oct. 8, 1935 |
| 2,098,654 | Carter | Nov. 9, 1937 |
| 2,179,822 | Imm | Nov. 19, 1939 |
| 2,238,782 | Roche | Apr. 15, 1941 |
| 2,303,858 | Ostberg | Dec. 1, 1942 |
| 2,400,942 | Milner | May 28, 1946 |
| 2,402,567 | Milner | June 25, 1946 |
| 2,481,062 | Anderson | Sept. 6, 1949 |

FOREIGN PATENTS

| Number | Country | Date |
|---|---|---|
| 661,230 | Germany | June 14, 1938 |